(12) United States Patent
Ahn

(10) Patent No.: US 11,912,250 B2
(45) Date of Patent: Feb. 27, 2024

(54) BRAKE APPARATUS FOR VEHICLE

(71) Applicant: HYUNDAI MOBIS CO., LTD., Seoul (KR)

(72) Inventor: Sung Ki Ahn, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 248 days.

(21) Appl. No.: 17/465,892

(22) Filed: Sep. 3, 2021

(65) Prior Publication Data
US 2022/0410861 A1  Dec. 29, 2022

(30) Foreign Application Priority Data
Jun. 23, 2021  (KR) .................. 10-2021-0081459

(51) Int. Cl.
| | | |
|---|---|---|
| *B60T 13/58* | (2006.01) | |
| *B60T 8/94* | (2006.01) | |
| *B60T 13/14* | (2006.01) | |
| *B60T 13/16* | (2006.01) | |
| *B60T 13/66* | (2006.01) | |

(52) U.S. Cl.
CPC ............ *B60T 13/58* (2013.01); *B60T 8/94* (2013.01); *B60T 13/142* (2013.01); *B60T 13/161* (2013.01); *B60T 13/662* (2013.01); *B60T 2270/402* (2013.01); *B60T 2270/403* (2013.01);
(Continued)

(58) Field of Classification Search
CPC .......... B60T 13/58; B60T 8/94; B60T 13/142; B60T 13/161; B60T 13/662; B60T 2270/402; B60T 2270/403; B60T 2270/413; B60T 2270/414
See application file for complete search history.

(56) References Cited

U.S. PATENT DOCUMENTS

| | | | |
|---|---|---|---|
| 10,239,508 B2* | 3/2019 | Han ................. | B60T 8/4031 |
| 10,407,038 B2* | 9/2019 | Kobayashi ........... | B60T 8/368 |

(Continued)

FOREIGN PATENT DOCUMENTS

| | | |
|---|---|---|
| CN | 111301385 A | 6/2020 |
| DE | 102007000405 A1 | 2/2008 |

(Continued)

OTHER PUBLICATIONS

Translation of Chinese Patent No. CN 111301385 obtained from website: https://worldwide.espacenet.com on Jul. 5, 2023.*
(Continued)

*Primary Examiner* — Pamela Rodriguez
(74) *Attorney, Agent, or Firm* — NovoTechIP International PLLC

(57) ABSTRACT

The present disclosure in at least one embodiment provides a brake apparatus for vehicle, comprising: a reservoir configured to store brake oil; a pump housing configured to support the reservoir; a hydraulic circuit provided within the pump housing and connected to a wheel brake of the vehicle; a primary brake unit including a primary brake motor provided on a first side of the pump housing and configured to supply a first hydraulic pressure to the wheel brake via the hydraulic circuit; and a secondary brake unit including a secondary brake motor provided on a first side of the pump housing and configured to supply a second hydraulic pressure to the wheel brake via the hydraulic circuit.

18 Claims, 6 Drawing Sheets

(52) U.S. Cl.
CPC ... *B60T 2270/413* (2013.01); *B60T 2270/414* (2013.01)

(56) References Cited

U.S. PATENT DOCUMENTS

| | | | |
|---|---|---|---|
| 11,358,577 B2* | 6/2022 | Ahn | B60T 13/167 |
| 2020/0207321 A1* | 7/2020 | Plewnia | B60T 13/148 |

FOREIGN PATENT DOCUMENTS

| | | |
|---|---|---|
| DE | 102015206727 A1 | 10/2016 |
| DE | 102017208902 A1 | 11/2017 |
| DE | 102020111210 A1 | 10/2020 |
| JP | 2015113035 A | 6/2015 |
| KR | 10-2018-0079836 A | 7/2018 |
| WO | 2020204510 A1 | 10/2020 |

OTHER PUBLICATIONS

Translation of WO document No. 2020/20451 to Tarandek et al obtained from website: https://worldwide.espacenet.com on Jul. 5, 2023.*
Office Action dated Feb. 21, 2022 issued in corresponding German Application No. 102021123699.1.
Korean Office Action dated Feb. 20, 2023 in corresponding Korean Patent Application No. 10-2021-0081459.
Korean Office Action dated Oct. 25, 2023 in corresponding Korean Patent Application No. 10-2021-0081459.

\* cited by examiner

BRAKE APPARATUS FOR VEHICLE

CROSS-REFERENCE TO RELATED APPLICATIONS

This application is based on, and claims priority from, Korean Patent Application Number 10-2021-0081459, filed Jun. 23, 2021, the disclosure of which is incorporated by reference herein in its entirety.

BACKGROUND OF THE INVENTION

1. Field of the Invention

The present disclosure relates to a brake apparatus for vehicles. More specifically, the present disclosure relates to a brake apparatus for vehicles with a secondary brake unit.

2. Discussion of Related Art

The content described in this section merely provides background information for the present disclosure and does not constitute prior art.

A high-level autonomous driving reduces the intervention of the driver, which makes it necessary to ensure safety during emergency situations. Therefore, in vehicles for which the autonomous driving functions are to be introduced in the future, including electric vehicles, a brake function for an emergency situation must be ensured.

FIG. 1 is a sectional view of a conventional brake apparatus for vehicles.

Referring to FIG. 1, in a conventional vehicle, a single brake system 100 is responsible for the brake function of the vehicle. Conventional vehicles may lose their brake function and thereby cause an accident, since there is no brake system to replace a single brake system 100 when it malfunctions.

In order to prevent accident, a vehicle can additionally be equipped with a secondary brake system in addition to the main brake system. It is then possible to brake the vehicle by the remaining brake system in case where a problem occurs in one of the main brake system and the secondary brake system.

Meanwhile, when a secondary brake device is provided, there is a problem that the configuration becomes complicated and the weight of the vehicle is increased. For example, eight additional pipes in the entire brake system would complicate the configuration and increase weight. In addition, the transfer of the working fluid can be slowed down along the length of the piping connecting the primary to the secondary systems. As a result, there is a problem that the brake response performance is degraded.

BRIEF SUMMARY OF THE INVENTION

The present disclosure in at least one embodiment provides a brake apparatus for vehicle, comprising: a reservoir configured to store brake oil; a pump housing configured to support the reservoir; a hydraulic circuit provided within the pump housing and connected to a wheel brake of the vehicle; a primary brake unit including a primary brake motor provided on a first side of the pump housing and configured to supply a first hydraulic pressure to the wheel brake via the hydraulic circuit; and a secondary brake unit including a secondary brake motor provided on a first side of the pump housing and configured to supply a second hydraulic pressure to the wheel brake via the hydraulic circuit.

DETAILED DESCRIPTION OF THE INVENTION

Figure 1:
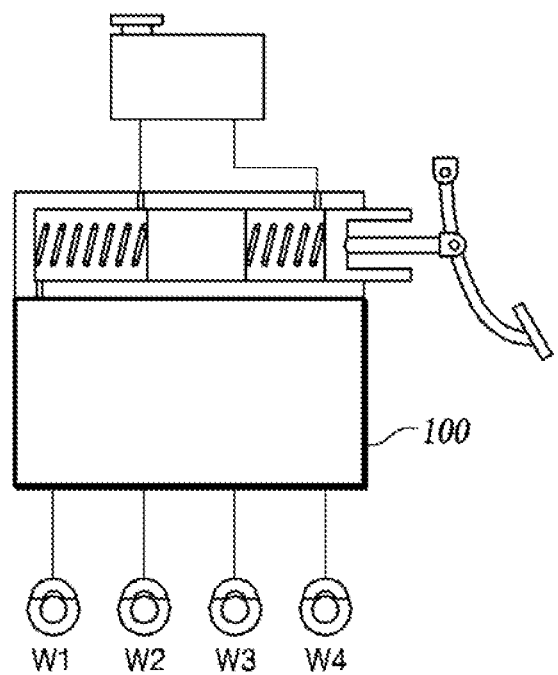
FIG. 1 is a sectional view showing a conventional brake apparatus for vehicles.

Accordingly, the present disclosure has been made in order to improve the above-described problems, and provides a brake apparatus for vehicles that can simplify the configuration of a brake system in which a redundancy brake function is implemented and weight of the brake system can be reduced by installing a main braking unit and a secondary brake unit in one pump housing.

In addition, the present disclosure provides a brake apparatus for vehicles in which a redundancy brake function is implemented and has an excellent brake response performance by providing a primary brake unit and a secondary brake unit in one pump housing.

The problems to be solved by the present disclosure are not limited to the problems mentioned above, and other problems not mentioned will be apparent to those skilled in the art from the following description.

Some embodiments of the present disclosure will now be described in detail with reference to the illustrative drawings. It should be noted that, when reference numerals are added to the components in each drawing, the same components have the same numerals as possible, even if they are shown on different drawings. In the description of the present disclosure, a detailed description of a related known configuration or function is omitted when it is determined that the gist of the disclosure can be made.

In describing the components of the embodiments in accordance with the present disclosure, reference numerals such as first, second, i), ii), a), and b) may be used. Such symbols are only for distinguishing the components from other components, and the nature or order of the components is not limited by the symbols. When a portion in the specification is referred to as "comprising" or "including" a component, it means that the component may further comprise other components rather than excluding other components unless explicitly stated to the contrary.

A brake apparatus for vehicles in accordance with an embodiment of the present disclosure includes all or part of a reservoir 210, a pump housing 220, a hydraulic circuit 610, a primary brake unit 230, a secondary brake unit 240, a master cylinder 510, a first controller 310, a second controller 320, a first power source (not shown), and a second power source.

Referring to FIGS. 2 to 6, the reservoir 210 is configured to store hydraulic fluid. The reservoir 210 in accordance with an embodiment of the present disclosure is provided on the peripheral surface of the pump housing 220. This is to reduce the installation space of the brake device. The reservoir can supply the hydraulic fluid to the hydraulic circuit 610, the wheel brake 520, etc. that are included in the brake apparatus for vehicles. The reservoir 210 receives the hydraulic fluid sent from the cylinder of the wheel brake 520 and decompresses the hydraulic pressure acting on the cylinder. The reservoir 210 has a narrow width in order to secure the installation space of the other components, and may be installed on the peripheral surface of the pump housing 220 such that the circumferential direction of the pumping housing 220 and the longitudinal direction of the reservoir 210 coincide with each other. That is, the reservoir 210 may be installed parallel to one surface of the pump housing 220.

Referring to FIGS. 2 to 6, the pump housing 220 supports the reservoir 210. Inside the pump housing 220 is formed a hydraulic circuit 610 which is connected to at least one wheel brake 520. Further, inside the pump housing 220 is formed a hollow for accommodating the pump. A primary brake motor 231 and a secondary brake motor 241, which will be described below, are disposed on one side of the pump housing 220. The first controller 310 and the second controller 320 are arranged on the opposite side thereof. The pump housing here refers to a functional unit which supports the reservoir and in which a hydraulic circuit for braking the vehicle is formed, for example, a pump housing which performs the above function by assembling two blocks.

The hydraulic circuit 610 is provided within the pump housing 220 and is connected to at least one wheel brake 520. Specifically, the end of the hydraulic circuit 610 may be in communication with the cylinder of at least one wheel brake 510. The hydraulic circuit 610 may be connected to the wheel brake 520, as well as an accumulator, a pump, a master cylinder 510, a reservoir 210, etc. that temporarily stores hydraulic fluid discharged from the wheel brake 520 cylinder. The hydraulic circuit 610 is provided with one or more valves 330 to control the hydraulic pressure and the flow of fluid applied to the hydraulic circuit 610, and to each component connected thereto.

Figure 2:
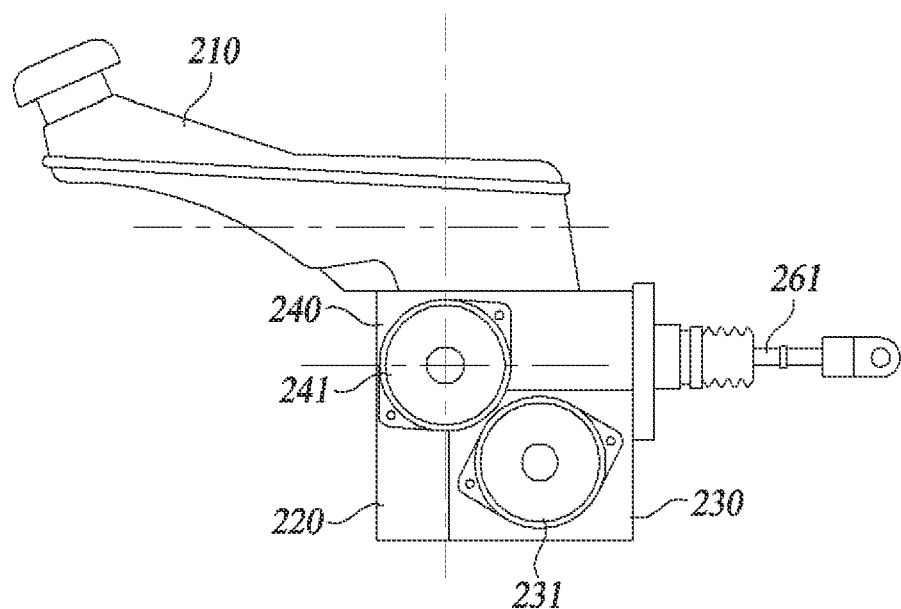
FIG. 2 is a side view showing one side surface of a brake apparatus for vehicles in accordance with an embodiment of the present disclosure.
Figure 3:
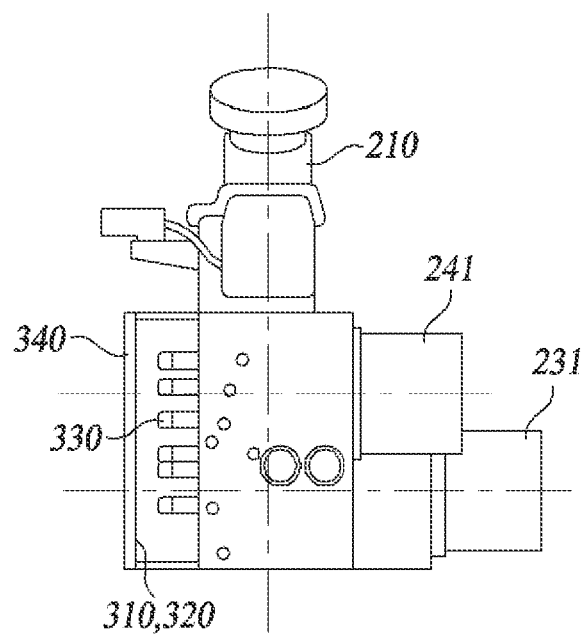
FIG. 3 is a front view of the brake apparatus for vehicles in accordance with an embodiment of the present disclosure.
Figure 6:
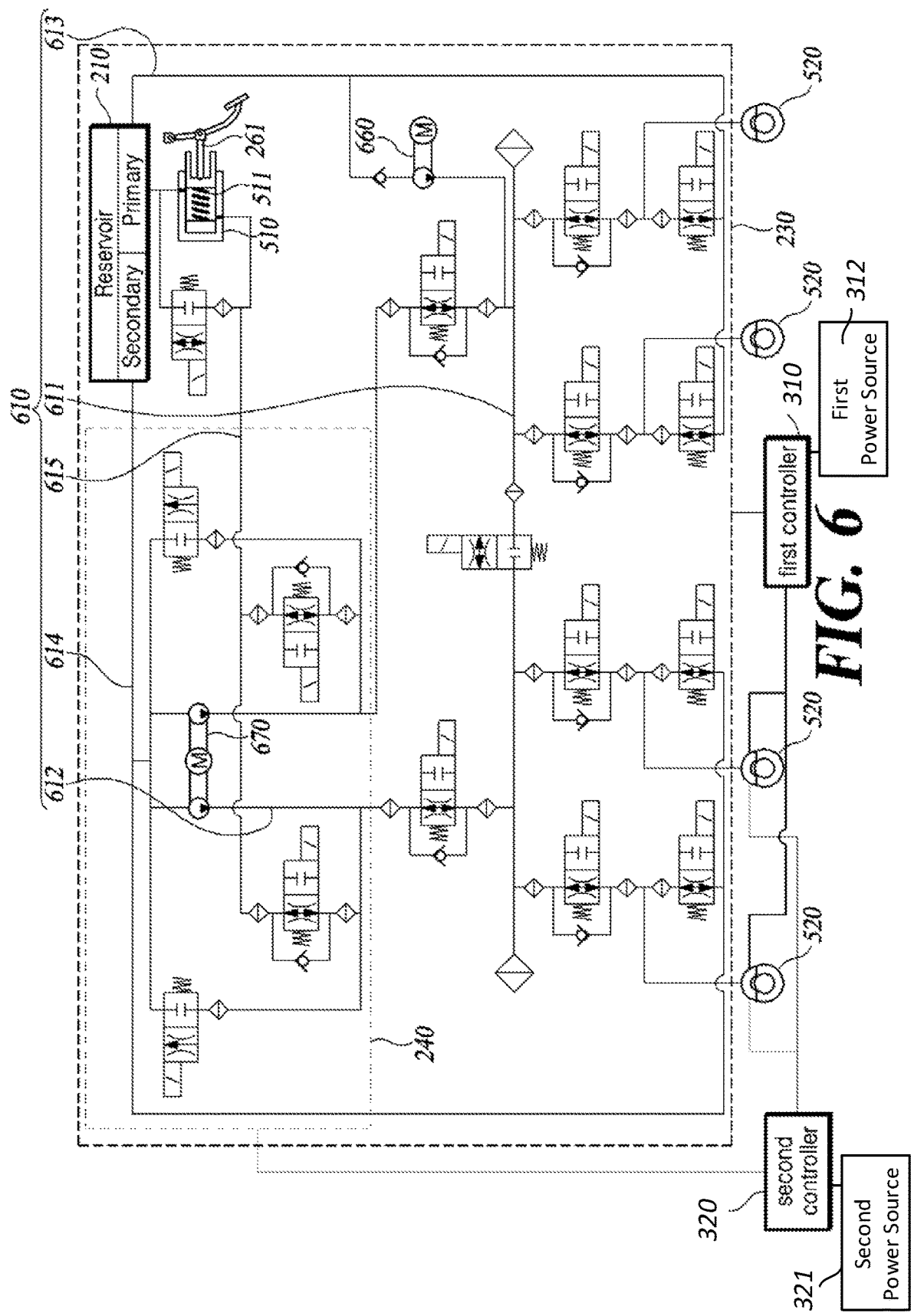
FIG. 6 is a block diagram illustrating a hydraulic circuit of the brake apparatus for vehicles in accordance with an embodiment of the present disclosure.

Referring to FIG. 2, FIG. 3 and FIG. 6, the primary brake unit 230 includes a primary brake motor 231 installed on one side of the pump housing 220. It is also configured to supply hydraulic pressure to at least one wheel brake 520 via the hydraulic circuit 610. The primary brake unit 230 includes an actuator that pressurizes the hydraulic fluid using the power of the primary brake motor 231 to supply the hydraulic pressure to the wheel brake 520. The actuator of the primary brake unit 230 in accordance with an embodiment of the present disclosure is connected to one lead-in flow path and one discharge flow path, but various implementations are possible, such as having two discharge flow paths. The primary brake unit 230 may be controlled by a first controller 310. Here, the control of the brake unit such as the primary brake unit includes a case of controlling the driving state of the valve 330 comprised in the brake unit or installed in the hydraulic circuit 610 connected to the brake unit. For example, a solenoid valve 330 that closes or opens when current is applied by the controller may be used to control the flow direction of hydraulic fluid or hydraulic fluid in the hydraulic line that the brake unit includes.

The secondary brake unit 240 includes a secondary brake motor 241 installed on one surface of the pump housing 220. The secondary brake motor 241 of the present disclosure may be installed on one surface of the pump housing 220 together with the primary brake motor 231. A conventional vehicle further includes, apart from the housing in which the primary brake motor 231 is installed, a housing where the secondary brake motor 241 is installed and connects housings on both the sides by a plurality of hydraulic lines. On the contrary, the secondary brake motor 241 of the present disclosure is installed on one side of the pump housing 220 together with the primary brake motor 231, thereby reducing the volume of the redundancy brake. Further, by installing the secondary brake unit 240 and the primary brake unit 230 to be adjacent to each other, there is an advantage in which the hydraulic fluid is rapidly transmitted between the secondary brake unit 240 and the primary brake unit. The secondary brake unit 240 is configured to supply hydraulic pressure to at least one wheel brake 520 via the hydraulic circuit 610, so that the vehicle can be braked when the primary brake unit 230 malfunctions. However, in the present disclosure, the primary brake unit 230 and the secondary brake unit 240 are expressions to distinguish respective brake units that can perform braking of the vehicle independently, and the present invention is not limited to the embodiment in which the secondary brake unit 240 performs only an auxiliary role of the primary brake unit 230. The secondary brake unit 240 of the present disclosure may be configured to perform the same or corresponding functions as the primary brake unit 230. The secondary brake unit 240 may be controlled by a first controller 310 and a second controller 320 described below.

Figure 5:
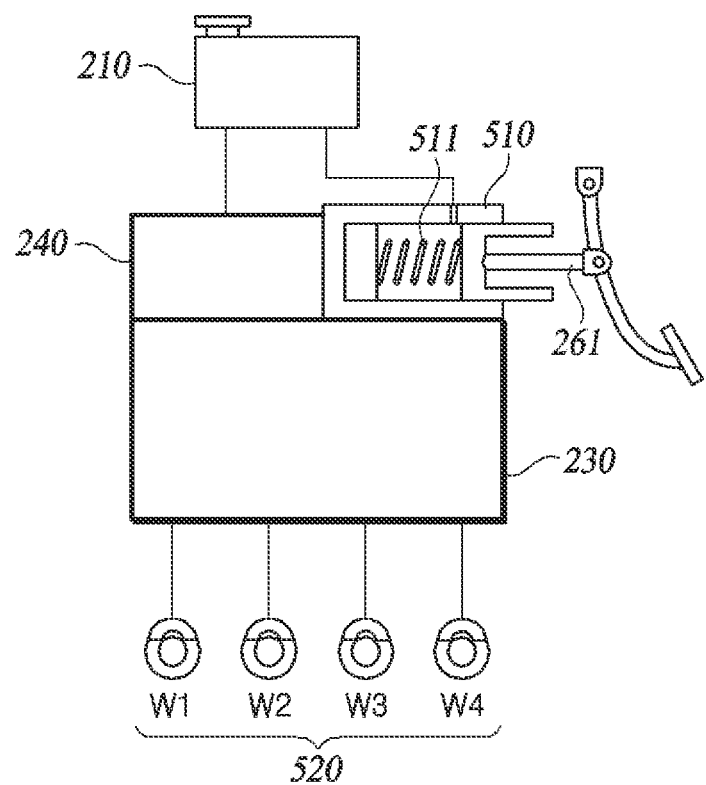
FIG. 5 is a cross-sectional view illustrating the brake apparatus for vehicles in accordance with an embodiment of the present disclosure.

Referring to FIG. 5, a brake apparatus for vehicles in accordance with an embodiment of the present disclosure includes a master cylinder 510 having a chamber 511 in which hydraulic pressure is formed or generated.

Master cylinder 510 may include a pressurizer 260 configured to establish hydraulic pressure in chamber 511. For example, it may include a pedal rod 261 configured to press the chamber 511 by a pedal stroke of the driver. Here, the pedal stroke includes, in addition to the configuration that the pedal rod 261 connected to the pedal by the driver's pedal stroke presses the piston inside the chamber 511, a configuration in which a pedal stroke of the driver generates an electrical signal to move the pressurizer 260. The pressurizer 260 may be a spindle configured to move a piston installed inside the master cylinder 510.

Referring to FIGS. 2 to 5, the secondary brake unit 240 in accordance with an embodiment of the present disclosure is disposed at least partially in the axial front of the master cylinder 510. Here, the axial front refers to a direction in which the piston of the master cylinder 510 pressurizes the fluid in the chamber 511. Specifically, the secondary brake motor 241 may be installed on one surface of the axial front pump housing 220 of the master cylinder 510. This has an advantage of reducing the volume of the brake device for a vehicle in which the redundancy function is implemented. Further, since the secondary brake unit 240 is disposed close to the master cylinder 510, there is an advantage of reducing the transfer time of the hydraulic fluid from the master cylinders 510 to the secondary brake unit 240. When the master cylinder 510 is disposed at a position adjacent to the reservoir 210, the secondary brake unit 240 provided in front of the master cylinder 510 also comes into contact with the reservoir 210 and has an advantage of reducing the transfer time of the hydraulic fluid from the reservoir 210.

Referring to FIG. 5, a master cylinder 510 in accordance with an embodiment of the present disclosure is a single chamber master cylinder 510. That is, in the master cylinder having two chambers, one chamber is replaced with the secondary brake unit 240. By using the single chamber master cylinder 510 instead of a long master cylinder having a plurality of chambers, it is possible to reduce the weight of the entire brake device and to secure the installation position of the secondary brake unit 240 axial front of the master cylinder 510. In addition, a brake response performance of the secondary brake unit 240 can be improved by reducing the length of the suction flow path for sucking the hydraulic fluid from the master cylinder 510. Reducing the volume of the interior chamber of the master cylinder 510 may reduce the working fluid flow rate, but the motor of the secondary brake unit 240 may operate to offset it to thereby maintain the decompression and decompression performances of the brake device.

Referring to FIGS. 2 to 5, the primary brake unit 230 in accordance with an embodiment of the present disclosure is at least partially disposed at a position perpendicular to the axial direction of the master cylinder 510. For example, the primary brake motor 231 may be installed on one surface of the pump housing 220 at a position perpendicular to the axial direction of the master cylinder 510. Thus, it is possible to arrange the primary brake unit 230 at a position that does not overlap the installation position of the secondary brake unit 240 for the redundancy brake function.

The master cylinder 510 in accordance with an embodiment of the present disclosure includes a pressurizer 260 configured to form hydraulic pressure in the chamber 511.

Figure 4:
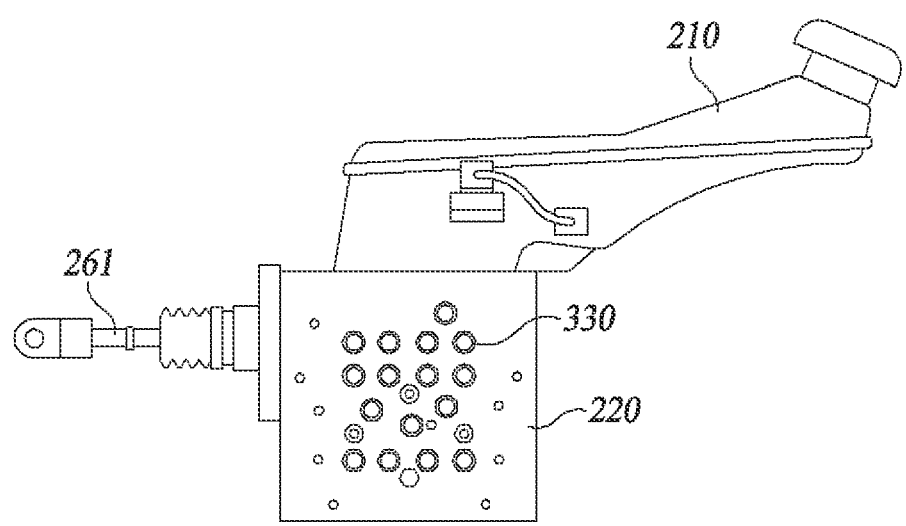
FIG. 4 is a side view showing the other side surface of the brake apparatus for vehicles in accordance with an embodiment of the present disclosure.

Referring to FIGS. 2 to 4, the longitudinal direction of the pressurizer 260 in accordance with an embodiment of the present disclosure is parallel to the length of the reservoir 210. Further, the rotation axis of the secondary brake motor 241 and/or the primary brake motor 231 in accordance with an embodiment of the present disclosure is perpendicular to the longitudinal direction of the reservoir 210. It becomes easier to reduce the volume of the entire brake device by using the layout in which the respective components are arranged in parallel or perpendicular, and to secure the installation position of the brake device.

Referring to FIG. 6, the first controller 310 in accordance with an embodiment of the present disclosure controls the primary brake unit 230. Here, the control of the primary brake unit 230 includes controlling the driving state of the valve 330 included in the brake unit or installed in the hydraulic circuit 610 connected to the brake unit. The present disclosure is not limited to the first controller 310 controlling only the primary brake unit 230. The first controller 310 may be configured to control both the primary brake unit 230 and the secondary brake unit 240.

The second controller 320 in accordance with an embodiment of the present disclosure controls the secondary brake unit 240 independently of the first controller 310. Alternatively, the second controller 320 in accordance with an embodiment of the present disclosure may control the primary brake unit 230 and the secondary brake unit 240 independently of the first controller 310. By controlling the primary brake unit 230 and the secondary brake unit 240 by using separate controllers, it is possible to control the brake device such that even if one controller fails, the remaining controller properly perform the brake function of the vehicle.

For example, the description will be given of a case where the first controller 310 controls the primary brake unit 230 and the second controller 320 controls the secondary brake unit 240 independently of the first controller 310. When the first controller 310 malfunctions, the second controller 320 may be operative to control the secondary brake unit 240 such that it brakes the vehicle. Conversely, if the second controller 320 fails, the primary brake unit 230 controlled by the first controller 310 may operate to brake the vehicle.

If either the first controller 310 or the second controller 320 malfunctions, the malfunctioning controller may send a signal to the well-operating controller that the problem has occurred. The well-operating controller can receive a signal from the controller that indicates that a problem has occurred.

The controller may be formed as a printed circuit board printed with electronic elements for controlling the rotation of the motor and the opening/closing of the solenoid valve 330.

The primary brake motor 231 and the secondary brake motor 241 of the brake apparatus for vehicle in accordance with an embodiment of the present disclosure are disposed on one side of the pump housing 220, and the first controller 310 and the second controller 320 are disposed at the other side of a pump housing 220. This allows each controller to control the solenoid valve 330 and the like disposed on the other side of the pump housing 220, while reducing the volume of the entire brake apparatus. For example, the first controller 310 and the second controller 320, which are formed of a printed circuit board on the other side of the pump housing 220 of the present disclosure, may be installed parallel to the other surface of the pumping housing 220, and the controller housing 340 may be configured to accommodate a part of the circuit board and the valve 330.

A first power source 312 provides a current to the first controller 310. The current provided by the first power source 312 causes the first controller 310 to open and close the solenoid valve 330.

A second power source 321 provides another current to the second controller 320 independent of the first power source 312. With the current provided by the second power source 321, the second controller 320 opens and closes the solenoid valve 330. In addition, the second power source 321 provides the current to the second controller 320 independent of the first power source 312, so that even if a failure occurs in the first electric source 312, the current is provided to the first controller 320 by the second electric source 321 and the secondary brake unit 240 or the primary brake unit 230 is controlled by the second controller 320. Alternatively, current may be applied to the first controller 310 by the first power source 312 even if a failure occurs in the second power source 321, and the primary brake unit 230 alone or the primary brake unit 230 and the secondary brake unit 240 may be controlled by the second controller 310.

Referring to FIG. 6, a brake apparatus for vehicle in accordance with an embodiment of the present disclosure includes a primary brake actuator 660 that generates hydraulic pressure in the primary brake unit 230 and a first hydraulic circuit 611 that connects the primary brake actuator 660 to a wheel brake 520. The secondary brake unit 240 includes a secondary brake actuator 670 that generates hydraulic pressure in the secondary brake unit 240, and a second hydraulic circuit 612 that connects the secondary brake actuator 670 to the first hydraulic circuit 611. The hydraulic pressure generated by the actuator of the secondary brake unit 240 is applied to the cylinder of the wheel brake 520 by the second hydraulic circuit 612. It also includes a third hydraulic circuit 613 connecting the primary brake actuator 660 to the reservoir 210 and a fourth hydraulic circuit 614 connecting the secondary brake actuator 670 to the reservoir 210. It also comprises a fifth hydraulic circuit 615 connecting the chamber 511 of the master cylinder 510 to the first hydraulic circuit 611. By the fifth hydraulic circuit 615, it is possible to brake the vehicle by the hydraulic pressure formed in the chamber 511 of the master cylinder 510 by pushing the pedal rod 261 or the like in an emergency situation in which both the secondary brake unit 240 and the primary brake unit 230 are not in operation.

The brake apparatus for vehicles in accordance with an embodiment of the present disclosure has an advantage of simplifying the configuration of the brake apparatus in which a redundancy brake function is implemented and reducing the weight of the brake apparatus by installing the primary brake unit 230 and the secondary brake unit 240 in one pump housing 220. In addition, there is an advantage that the brake response performance is not degraded while the redundancy brake function is implemented.

The foregoing description is merely illustrative of the teachings of the present embodiments, and various modifications and changes may be made without departing from the essential characteristics of the embodiments by those skilled in the art. Therefore, the present embodiments are not intended to limit the technical idea of the present embodiment but are intended to be described, and the scope of the technical idea of the present embodiment is not limited by such embodiments. The scope of protection of the present embodiment is to be interpreted by the following claims, and all technical ideas that fall within the equivalent scope are to be interpreted as being included in the scope of this embodiment.

What is claimed is:

1. A brake apparatus for a vehicle, comprising:
   a reservoir configured to store brake oil;
   a pump housing configured to support the reservoir;
   a hydraulic circuit provided within the pump housing and connected to a wheel brake of the vehicle;
   a primary brake unit including a primary brake motor provided on a first side of the pump housing and configured to supply a first hydraulic pressure to the wheel brake via the hydraulic circuit;
   a secondary brake unit including a secondary brake motor provided on the first side of the pump housing and configured to supply a second hydraulic pressure to the wheel brake via the hydraulic circuit; and
   a master cylinder having a first chamber, wherein the secondary brake unit is disposed on an axis of the master cylinder and configured as a second chamber for the master cylinder.

2. The brake apparatus of claim 1, wherein the secondary brake unit is at least partially disposed at an axial front of the master cylinder.

3. The brake apparatus of claim 1, wherein the primary brake unit is at least partially disposed at a position perpendicular to an axial direction of the master cylinder.

4. The brake apparatus of claim 1, wherein a rotation axis of the secondary brake motor is perpendicular to a longitudinal direction of the reservoir.

5. The brake apparatus of claim 1, wherein a rotation axis of the primary brake motor is perpendicular to a longitudinal direction of the reservoir.

6. The brake apparatus of claim 1, wherein:
   the master cylinder includes a pressurizer configured to generate the third hydraulic pressure in the chamber, and
   a longitudinal direction of the pressurizer is parallel to a longitudinal direction of the reservoir.

7. The brake apparatus of claim 1, further comprising:
   a first controller configured to control the primary brake unit; and
   a second controller configured to control the secondary brake unit independently of the first controller.

8. The brake apparatus of claim 7, further comprising:
   a first power source configured to provide a first current to the first controller; and
   a second power source configured to provide a second current to the second controller independently of the first power source.

9. The brake apparatus of claim 1, further comprising:
   a first controller configured to control the primary and secondary brake units; and
   a second controller configured to control the primary and secondary brake units independently of the first controller.

10. The brake apparatus of claim 1, further comprising:
    a first controller configured to control the primary and secondary brake units; and
    a second controller configured to control the secondary brake unit,
    wherein the primary and secondary brake motors are disposed on the first side of the pump housing, and the first and second controllers are disposed on an opposite side of the first side.

11. The brake apparatus of claim 1, wherein the primary brake unit is installed on the first side of the pump housing in a position perpendicular to the axis of the master cylinder.

12. A brake apparatus for a vehicle, comprising:
    a reservoir configured to store brake oil;
    a pump housing configured to support the reservoir;
    a hydraulic circuit provided within the pump housing and connected to a wheel brake of the vehicle;
    a primary brake unit including a primary brake motor provided on a first side of the pump housing and configured to supply a first hydraulic pressure to the wheel brake via the hydraulic circuit;
    a secondary brake unit including a secondary brake motor provided on the first side of the pump housing and configured to supply a second hydraulic pressure to the wheel brake via the hydraulic circuit; and
    a master cylinder;
    wherein the primary brake unit is installed on the first side of the pump housing in a position perpendicular to an axial direction of the master cylinder.

13. The brake apparatus of claim 12, wherein the master cylinder comprises a single-chamber master cylinder.

14. The brake apparatus of claim 12, wherein the master cylinder has a first chamber, and wherein the secondary brake unit is disposed on an axis of the master cylinder and configured as a second chamber for the master cylinder.

15. The brake apparatus of claim 12, further comprising:
    a first controller configured to control the primary brake unit; and
    a second controller configured to control the secondary brake unit independently of the first controller.

16. The brake apparatus of claim 12, further comprising:
    a first controller configured to control the primary and secondary brake units; and
    a second controller configured to control the primary and secondary brake units independently of the first controller.

17. The brake apparatus of claim 12, further comprising:
    a first controller configured to control the primary and secondary brake units; and
    a second controller configured to control the secondary brake unit,
    wherein the primary and secondary brake motors are disposed on a first side of the pump housing, and the first and second controllers are incorporated in a controller housing disposed on an opposite side of the pump housing, the pump housing covering a number of solenoids controlled by the first and second controllers.

18. The brake apparatus of claim 17, further comprising:
a first power source configured to provide a first current to the first controller; and
a second power source configured to provide a second current to the second controller independently of the first power source.

* * * * *